E. P. ROBINSON.
CONTROLLING DEVICE FOR INTERNAL COMBUSTION ENGINES.
APPLICATION FILED MAR. 9, 1908.

1,059,317.
Patented Apr. 15, 1913.

Witnesses:
Jas. J. Maloney.

Inventor:
Edward P. Robinson,
by J. P. and H. Livermore,
Attys.

UNITED STATES PATENT OFFICE.

EDWARD P. ROBINSON, OF MALDEN, MASSACHUSETTS, ASSIGNOR TO REVERSIBLE GAS-ENGINE COMPANY, A CORPORATION OF MAINE.

CONTROLLING DEVICE FOR INTERNAL-COMBUSTION ENGINES.

1,059,317.   Specification of Letters Patent.   Patented Apr. 15, 1913.

Application filed March 9, 1908. Serial No. 420,000.

*To all whom it may concern:*

Be it known that I, EDWARD P. ROBINSON, a citizen of the United States, residing in Malden, in the county of Middlesex and State of Massachusetts, have invented an Improvement in Controlling Devices for Internal-Combustion Engines, of which the following description, in connection with the accompanying drawings, is a specification, like letters on the drawings representing like parts.

The present invention relates to a controlling device for internal combustion engines, and is embodied in means for controlling a multi-cylinder engine by separately varying the intake of the several cylinders. The controlling device may be used in addition to the ordinary throttle control at the carbureter, or it may be utilized as the only control for the engine, the purpose of the invention being to maintain one or more cylinders at substantially full capacity and cutting the capacity of one or more other cylinders down to substantially nothing. It is not intended, however, to completely shut off the idle cylinders, the device being preferably provided with means whereby sufficient charge is admitted to every cylinder to counteract the compression load and piston resistance.

In accordance with the invention, the several cylinders are provided with separate intake pipes all of which are supplied from a common source such as a carbureter which may, if desired, be provided with a throttle of the kind commonly used. The several intake pipes are provided with separate controlling valves which may be, and preferably are operated by a common actuating member so as to be operated simultaneously. In this arrangement the valves are so related to the actuating member that a movement thereof in one direction will successively cut off or reduce the capacity of the intake pipes of the cylinders, all of the intake pipes being open to their fullest capacity when the valve is in its normal position.

Figure 1:
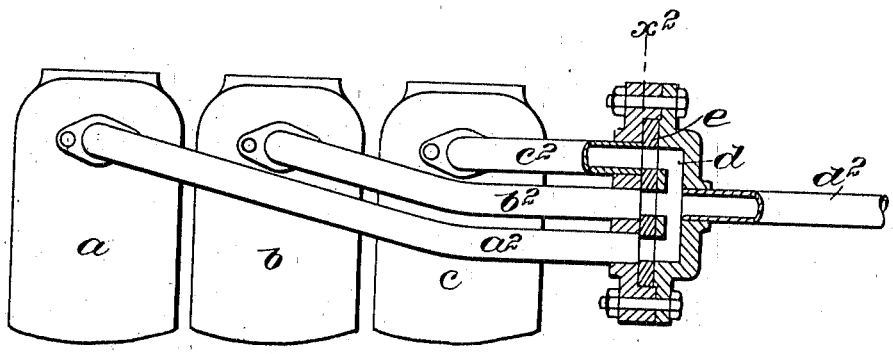
Figure 2:
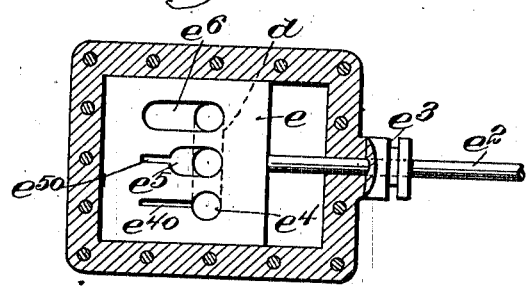
Figure 3:
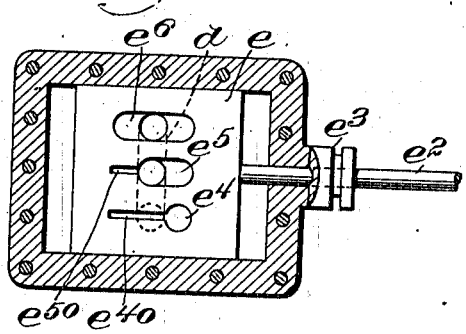

Figure 1 is an elevation of an explosive engine showing the controlling device embodying the invention applied thereto, the said device being shown in vertical section; Fig. 2 is a vertical section on the line $x^2$ of Fig. 1; and Fig. 3 is a similar view showing the valve in a different position.

The invention is herein shown as embodied in a three cylinder engine, it being obvious that an engine having any number of cylinders more than one may be provided with a controlling device of the kind described.

The cylinders $a$, $b$ and $c$ are provided with separate intake pipes $a^2$, $b^2$ and $c^2$ which receive the explosive mixture from a chamber $d$ supplied from any suitable source through an intake pipe $d^2$. It is obviously not essential that the common intake should be in the form of a chamber, but this is a convenient construction, as the said chamber may also be utilized to afford a casing for the valves which separately control the intake pipes $a^2$, $b^2$ and $c^2$. In the construction shown, the several valve openings are formed in a single member $e$ shown as a slide, longitudinally movable in the chamber $d$, as by a rod $e^2$ which extends out from the chamber through a stuffing box $e^3$ to keep the chamber gas-tight.

The several valves are in the form of openings $e^4$, $e^5$ and $e^6$ which are of different sizes and arranged so that when the slide $e$ is in the position shown in Fig. 2, all of the intake passages leading to the several cylinders are wide open. The valve openings $e^5$ and $e^6$, however, are larger in area than the opening $e^4$, the arrangement being such that the opening $e^4$ will be moved out of alinement with the intake pipe $a^2$, so as to close or partially close the said pipe while the openings $e^5$ and $e^6$ are still in alinement with the pipes $b^2$ and $c^2$. This is indicated in Fig. 3 in which the slide is in its intermediate position, and it will be seen that a further movement of the slide $e$ will also cut off the intake pipe $b^2$, leaving the cylinder $c$ alone fully supplied with the explosive mixture.

In order to admit sufficient gas to all the cylinders under all conditions, to ignite and create sufficient expansion to overcome the load due to compression and friction, the valve openings $e^4$ and $e^5$ are provided with extensions in the form of narrow slots $e^{40}$, and $e^{50}$, cut in the slide $e$, so that a certain amount of gas is admitted to the intake pipes through the slots regardless of the position of the slide $e$.

While this controlling valve may be used as the sole means for controlling a multi-cylinder engine, it is especially adapted for use as a supplemental control to be used in conjunction with a single throttle controlling the main supply through the main intake pipe $d^2$. By this construction, the main throttle can be kept wide open if, for any reason, it is desirable to do so, and the cylinders throttled substantially to a cut-off point by the supplemental controlling valve $e$.

Claims.

1. In a multi-cylinder internal combustion engine, an intake pipe common to all the cylinders; separate intake passages supplied from said intake pipe, said intake passages leading to the several cylinders respectively; and a throttle valve common to all the said passages adapted by a continuous movement in one direction to throttle said passages successively without wholly closing any of them.

2. The combination with the several cylinders of a multi-cylinder internal combustion engine; of an intake pipe common to all the cylinders; separate intake passages leading from said pipe to said cylinders, respectively; and a slide valve controlling all the said intake passages, said valve having different sized apertures, one for each passage, whereby a continuous movement of the valve in one direction successively varies the capacity of said intake pipes, respectively.

3. In a multi-cylinder engine the combination with separate intake pipes leading to the several cylinders; of a slide valve movable across said intake pipes and provided with openings differing in length; and narrow slots projecting beyond the openings, substantially as and for the purpose described.

In testimony whereof, I have signed my name to this specification in the presence of two subscribing witnesses.

EDWARD P. ROBINSON.

Witnesses:
JAMES J. MALONEY,
M. E. COVENEY.

Copies of this patent may be obtained for five cents each, by addressing the "Commissioner of Patents, Washington, D. C."